(12) United States Patent
Gindrat

(10) Patent No.: US 10,252,825 B2
(45) Date of Patent: Apr. 9, 2019

(54) METHOD OF FEEDING ROD-SHAPED CONSUMER GOODS TO A PACKING APPARATUS

(71) Applicant: Philip Morris Products S.A., Neuchatel (CH)

(72) Inventor: Pierre-Yves Gindrat, Saxon (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/509,242

(22) PCT Filed: Sep. 18, 2015

(86) PCT No.: PCT/EP2015/071450
§ 371 (c)(1),
(2) Date: Mar. 7, 2017

(87) PCT Pub. No.: WO2016/042135
PCT Pub. Date: Mar. 24, 2016

(65) Prior Publication Data
US 2017/0275030 A1    Sep. 28, 2017

(30) Foreign Application Priority Data

Sep. 19, 2014    (EP) .................................... 14185653

(51) Int. Cl.
*A24C 5/32*    (2006.01)
*A24C 5/35*    (2006.01)
(Continued)

(52) U.S. Cl.
CPC .............. *B65B 19/04* (2013.01); *A24C 5/325* (2013.01); *A24C 5/35* (2013.01); *B65B 19/10* (2013.01);
(Continued)

(58) Field of Classification Search
CPC .......... B65B 19/04; A24C 5/325; A24C 5/35; B65G 11/08; B65G 11/081; B65G 11/083;
(Continued)

(56) References Cited

U.S. PATENT DOCUMENTS

| 3,596,797 A | 8/1971 | Wallenborn |
| 3,885,683 A * | 5/1975 | Bornfleth ................. A24C 5/35 |
| | | 198/347.3 |

(Continued)

FOREIGN PATENT DOCUMENTS

| CN | 1182692 A | 5/1998 |
| CN | 103220923 A | 7/2013 |

(Continued)

OTHER PUBLICATIONS

International Search Report and Written Opinion dated Nov. 23, 2015 in PCT/EP2015/071450, filed Sep. 18, 2015.

(Continued)

*Primary Examiner* — Mark A Deuble
(74) *Attorney, Agent, or Firm* — Oblon, McClelland, Maier & Neustadt, L.L.P.

(57) ABSTRACT

A method of feeding rod-shaped consumer goods to a packing apparatus is provided, including providing a plurality of rod-shaped consumer goods to an upstream end of a stacking channel, and feeding the plurality of rod-shaped consumer goods along the stacking channel to a downstream end of the stacking channel. The upstream end of the stacking channel is higher than the downstream end in the vertical direction, and at least a portion of the stacking channel extends at an angle of between about 25 degrees and about 75 degrees with respect to the vertical direction. The method further includes receiving the plurality of rod-shaped consumer goods into a hopper from the downstream (Continued)

end of the stacking channel, and distributing the plurality of rod-shaped consumer goods from the hopper into a packing apparatus.

10 Claims, 3 Drawing Sheets

(51) Int. Cl.
*B65B 19/04* (2006.01)
*B65B 19/10* (2006.01)
*B65G 11/08* (2006.01)
*B65G 11/20* (2006.01)

(52) U.S. Cl.
CPC .............. *B65G 11/08* (2013.01); *B65G 11/20* (2013.01); *B65G 2201/0226* (2013.01)

(58) Field of Classification Search
CPC . B65G 11/085; B65G 11/086; B65G 11/0888; B65G 2201/0226
See application file for complete search history.

(56) References Cited

U.S. PATENT DOCUMENTS

| | | | | |
|---|---|---|---|---|
| 3,952,854 A | * | 4/1976 | Selonke | A24C 5/35 198/347.3 |
| 4,196,810 A | * | 4/1980 | Gurioli | B65B 19/04 209/535 |
| 4,222,477 A | * | 9/1980 | Molins | A24C 5/35 198/347.3 |
| 4,574,938 A | | 3/1986 | Orlandi | |
| 7,364,052 B2 | * | 4/2008 | Spatafora | A24C 5/325 131/280 |
| 2006/0237336 A1 | * | 10/2006 | Spatafora | A24C 5/35 206/271 |
| 2006/0272926 A1 | * | 12/2006 | Ferrari | A24C 5/35 198/347.1 |
| 2012/0125737 A1 | * | 5/2012 | Figarski | A24C 5/35 198/594 |

FOREIGN PATENT DOCUMENTS

| | | |
|---|---|---|
| FR | 2 189 994 A5 | 1/1974 |
| GB | 1 430 237 A | 3/1976 |
| WO | WO 02/083502 A1 | 10/2002 |
| WO | WO 03/039274 A1 | 5/2003 |
| WO | WO 2008/081160 A2 | 7/2008 |
| WO | WO 2012/164009 A2 | 12/2012 |

OTHER PUBLICATIONS

International Preliminary Report on Patentability dated Dec. 1, 2016 in PCT/EP2015/071450, filed Sep. 18, 2015.

Combined Chinese Office Action and Search Report dated Jan. 31, 2018 in Patent Application No. 201580049000.3 (with English language translation).

* cited by examiner

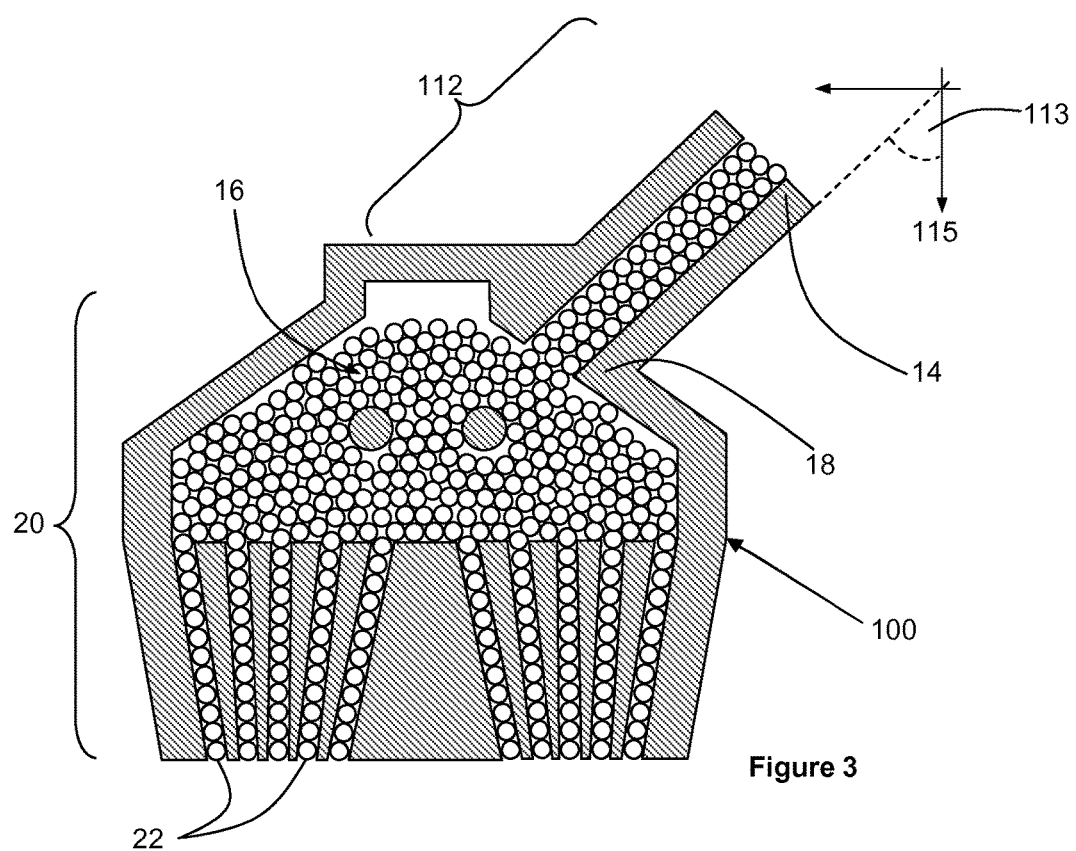
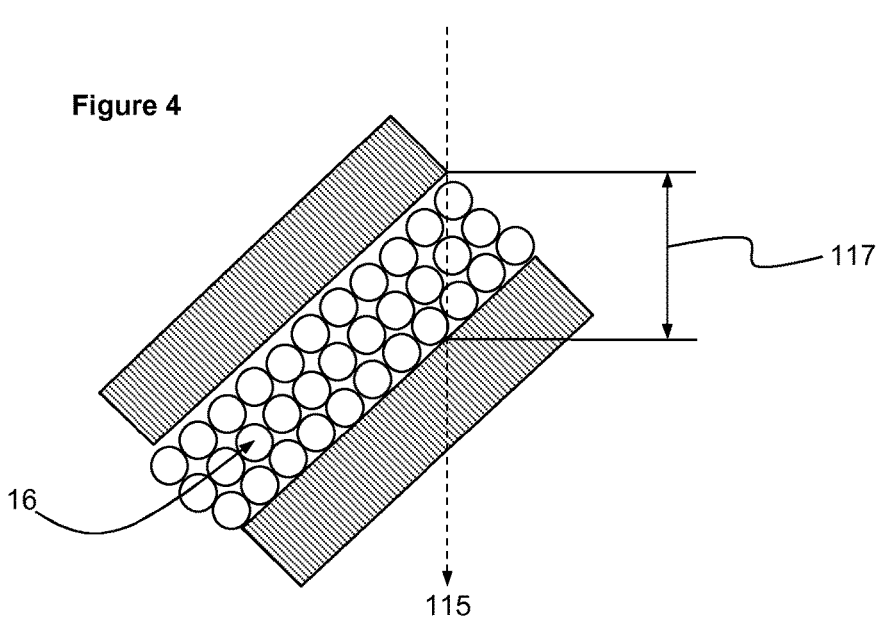

METHOD OF FEEDING ROD-SHAPED CONSUMER GOODS TO A PACKING APPARATUS

The present invention relates to a method of feeding rod-shaped consumer goods to a packing apparatus. The present invention also relates to a feeding apparatus for feeding rod-shaped consumer goods to a packing apparatus.

The handling of rod-shaped consumer goods can present a number of challenges in a high-speed manufacturing process. For example, aerosol-generating articles, such as filter cigarettes, are typically made from at least two cylindrical objects, for example a tobacco rod and a filter. During the manufacture of aerosol-generating articles, such as filter cigarettes, the two cylindrical objects are joined during a rolling process with a tipping paper. The tipping paper covers a first of the two cylindrical objects and extends over the second cylindrical object and thus secures the two cylindrical objects to each other. The tipping paper creates a small step-change between the circumference of the first cylindrical object and the second cylindrical object. This step creates an angle between the edge of the tipping paper and the free edge of the second cylindrical object. While the angle is generally small, however, during production, many of the finished aerosol generating articles may be stacked up on top of each other in a mass-flow or a hopper and the cumulative effect of each small angle may create a significant total angle at the top of the stack. This may cause the aerosol generating articles to jam in the mass-flow or hopper, particularly since a mass-flow production process allows a certain degree of free movement of the aerosol-generating articles which is necessary to accommodate the high flow rate. The 'stacking angle' effect depends on the size of the step created by the tipping paper and the length of the product between the free edge of the second cylindrical object and the tipping paper. The risk of jams is further increased when the product has an uneven mass distribution, in particular where the centre of mass of the article is in the section of the article with the smaller diameter. The effect increases further where the section of the article with the smaller diameter is ductile and therefore, where articles are stacked onto each other, may sink into adjacent articles due to gravitational forces, thus increasing the nesting of the articles on one side and in turn adding to the stacking angle.

There is therefore a need for methods and apparatus that can handle mass-flow of short and ductile cylindrical objects, in particular between a making section and a packaging section of the manufacturing process.

According to a first aspect of the present invention there is provided a method of feeding rod-shaped consumer goods to a packing apparatus, the method comprising providing a plurality of rod-shaped consumer goods to an upstream end of a stacking channel, and feeding the plurality of rod-shaped consumer goods along the stacking channel to a downstream end of the stacking channel. The upstream end of the stacking channel is higher than the downstream end in the vertical direction, and at least a portion of the stacking channel extends at an angle of between 25 degrees and 75 degrees with respect to the vertical direction. The method further comprises receiving the plurality of rod-shaped consumer goods into a hopper from the downstream end of the stacking channel, and distributing the plurality of rod-shaped consumer goods from the hopper into a packing apparatus.

As used herein, the term 'rod-shaped consumer goods' refers to elongate consumer goods each having an approximately circular or elliptical cross-sectional shape.

As used herein, the terms 'upstream' and 'downstream' when used to describe the relative positions of elements, or portions of elements, of the stacking channel or other apparatus refer to the direction in which the plurality of consumer goods moves during the manufacturing or packing process. That is, the consumer goods move in a downstream direction from an upstream end to a downstream end.

As used herein, references to the angle at which a portion of the stacking channel extends with respect to the vertical direction refer to the smallest angle between the vertical direction and the direction along which the consumer goods move through the portion of the stacking channel. In embodiments in which the stacking channel is non-linear, the angle between the portion of the stacking channel and the vertical direction is the smallest angle between the vertical direction and a tangent to the direction in which the consumer goods move through the respective portion of the stacking channel.

As used herein, the term "mass-flow" indicates the flow of multiple products along a general transport direction wherein the exact position of the product within the mass-flow is not known. Typically, in a mass-flow a single product has some degree of freedom for random movement relative to the general transport direction, for example upwards or downwards where the general transport direction is horizontal. Additionally, the individual velocity of a product along the general transport direction does not have to be equal to the average transport speed of products within the mass-flow.

By feeding the rod-shaped consumer goods through at least a portion of the stacking channel at an angle of between about 25 degrees and about 75 degrees with respect to the vertical direction, the method according to the present invention reduces the gravitational force acting along the stack of consumer goods. Therefore, the method according to the present invention can reduce undesirable compression of consumer goods at the bottom of the stack, which is particularly advantageous when handling consumer goods such as aerosol-generating articles that may comprise a step change in the diameter of each aerosol-generating article along the length of the article. In particular, reducing the gravitational forces acting along the stack of aerosol-generating articles can reduce the cumulative 'stacking angle' effect described above, which might otherwise cause a jam in the stacking channel. Feeding the rod-shaped consumer goods through at least a portion of the stacking channel at an angle of between about 25 degrees and about 75 degrees also reduces the effective height of the stack of consumer goods in the vertical direction. The reduction of the effective height of the stack of rod-shaped consumer goods in the vertical direction provides a geometric reduction in the cumulative 'stacking angle'.

The range of between about 25 degrees and about 75 degrees for the angle of at least a portion of the stacking channel with respect to the vertical direction provides a balance between angles that are shallow enough to provide a signification reduction in the compressive gravitational forces acting along the stacking channel and angles that are steep enough so that the component of gravitational force acting along the stacking channel is sufficient to facilitate movement of the consumer goods along the stacking channel and into the hopper, as well as minimising the floor space, or 'footprint', occupied by the stacking channel. Preferably, at least a portion of the stacking channel extends at an angle of between about 35 degrees and about 55 degrees with respect to the vertical direction, more preferably between about 40 degrees and about 50 degrees with respect to the vertical direction, most preferably about 45 degrees with respect to the vertical direction.

The stacking channel may be substantially linear along the entire length between its upstream and downstream ends. That is, the stacking channel may comprise a single linear segment extending between its upstream and downstream ends.

Alternatively, the stacking channel may comprise multiple linear segments, wherein each linear segment extends at a different angle with respect to the vertical direction. In such embodiments, all of the linear segments may extend at an angle of between about 25 degrees and about 75 degrees with respect to the vertical direction, preferably between about 35 degrees and about 55 degrees with respect to the vertical direction, more preferably between about 40 degrees and about 50 degrees with respect to the vertical direction, most preferably about 45 degrees with respect to the vertical direction.

Alternatively, only some of the linear segments may extend at an angle of between about 25 degrees and about 75 degrees with respect to the vertical direction, preferably between about 35 degrees and about 55 degrees with respect to the vertical direction, more preferably between about 40 degrees and about 50 degrees with respect to the vertical direction, most preferably about 45 degrees with respect to the vertical direction. For example, the stacking channel may comprise an upstream segment extending at an angle of less than about 25 degrees with respect to the vertical direction, an intermediate segment extending at an angle of between about 25 degrees and about 75 degrees, and a downstream segment extending at an angle of greater than about 75 degrees.

In a further alternative, at least a portion of the stacking channel may be curved. In some embodiments, the stacking channel may be curved along substantially its entire length. In such embodiments, the angle of the stacking channel with respect to the vertical direction will vary along the length of the stacking channel. Preferably, the angle of the stacking channel with respect to the vertical direction increases in the downstream direction.

In those embodiments in which the stacking channel is curved, the angle of the stacking channel may be between about 25 degrees and about 75 degrees at each point along the entire length of the stacking channel. Alternatively, only a portion of the stacking channel may extend at an angle of between about 25 degrees and about 75 degrees with respect to the vertical direction. For example, the upstream end of the stacking channel may extend at an angle of less than about 25 degrees with respect to the vertical direction. In some embodiments, the upstream end of the stacking channel may be substantially vertical. Additionally, or alternatively, the downstream end of the stacking channel may extend at an angle of greater than about 75 degrees with respect to the vertical direction. In any of these embodiments, at least a central portion of the stacking channel extends at an angle of between about 25 degrees and about 75 degrees with respect to the vertical direction.

In any of the embodiments described above, the step of feeding the plurality of rod-shaped consumer goods along the stacking channel may comprise moving the plurality of rod-shaped consumer goods on at least one conveyor along at least a portion of the stacking channel in the downstream direction. For example, the stacking channel may comprise at least one conveyor extending along a bottom side of the stacking channel along substantially the entire length of the stacking channel. Additionally, or alternatively, the stacking channel may comprise at least one conveyor extending along a top side of the stacking channel along substantially the entire length of the stacking channel.

Alternatively, the stacking channel may comprise one or more conveyors provided along only a portion of the stacking channel. For example, in those embodiments in which the angle between the stacking channel and the vertical direction is greater at the downstream end of the stacking channel, the stacking channel may comprise one or more conveyors extending along only a downstream portion of the stacking channel. The one or more conveyors may extend along the bottom side of the stacking channel, along the top side of the stacking channel, or along both the bottom and top sides of the stacking channel.

In any of the embodiments described above in which the rod-shaped consumer goods are moved along at least a portion of the stacking channel by at least one conveyor, the at least one conveyor may comprise at least one of a mechanically driven belt, such as a toothed belt, or a directed airflow.

In any of the embodiments described above, the method may further comprise a step of agitating the plurality of rod-shaped consumer goods as they move along the stacking channel. For example, the stacking channel may comprise a mechanical means for vibrating or otherwise agitating the plurality of rod-shaped consumer goods. In those embodiments comprising one or more conveyors, at least one of the conveyors may be configured to vibrate. Additionally, or alternatively, the stacking channel may comprise an airflow or multiple airflows that can create an air cushion in the mass flow of consumer goods. Such an air cushion can reduce friction between the consumer goods and facilitate a smooth product flow. The one or multiple airflows may be directed against the flow of consumer goods, so that the airflow is directed in the upstream direction.

In any of the embodiments described above, the stacking channel may have a length of between about 30 centimeters and about 300 centimeters between the upstream and downstream ends, preferably between about 50 centimeters and about 300 centimeters, more preferably between about 100 centimeters and about 300 centimeters. Using a stacking channel having a length within one of these ranges allows the stacking channel to function effectively as a buffer between an upstream manufacturing process and the packing process downstream of the hopper.

The step of providing a plurality of rod-shaped consumer goods may comprise providing a plurality of mouthpieces for aerosol-generating articles of a plurality of wrapped aerosol-generating substrates for aerosol-generating articles. As used herein, the term 'aerosol-generating substrate' is used to describe a substrate capable of releasing, upon heating, volatile compounds, which can form an aerosol. The aerosol generated from aerosol-generating substrate may be visible or invisible and may include vapours (for example, fine particles of substances, which are in a gaseous state, that are ordinarily liquid or solid at room temperature) as well as gases and liquid droplets of condensed vapours.

Preferably, the step of providing a plurality of rod-shaped consumer goods may comprise providing a plurality of aerosol-generating articles. Preferably, each aerosol-generating article comprises an aerosol-generating substrate, a mouthpiece, and a tipping wrapper securing the mouthpiece to a downstream end of the aerosol-generating substrate. In such embodiments, the tipping wrapper has an upstream edge extending around the aerosol-generating substrate and a downstream edge extending around a downstream end of the mouthpiece. Preferably, the distance between an upstream end of the aerosol-generating substrate and the upstream edge of the tipping wrapper is less than about 40 millimeters, preferably less than about 30 millimeters. As described above, the present invention can reduce the overall 'stacking angle' effect created in a stack of aerosol-generating articles each comprising a step change in their outer diameter created by the tipping wrapper, and the reduction in the 'stacking angle' effect provided by the present invention is particularly significant for aerosol-generating articles having a relatively short length.

As used herein, the terms 'upstream' and 'downstream' when used to describe the relative positions of elements, or portions of elements, of the aerosol-generating article refer to the direction in which a user draws on the aerosol-generating article during use thereof. That is, a user draws on the downstream end of the aerosol-generating article so that air enters the upstream end of the aerosol-generating article and moves downstream to the downstream end.

As a result of the reduction in the stacking angle effect provided by the present invention, the method according to the present invention can accommodate aerosol-generating articles each comprising a tipping wrapper having a thickness of between about 0.04 millimeters and about 0.06 millimeters. When wrapped around the outside of a mouthpiece and an aerosol-generating substrate to form an aerosol-generating article, the overlap at the seam in the tipping wrapper gives rise to a step change in the outer diameter of the aerosol-generating article of double the thickness of the tipping wrapper. Therefore, in those embodiments in which the tipping wrapper has a thickness of between about 0.04 millimeters and about 0.06 millimeters, the outer diameter of the aerosol-generating article has a maximum step change at the upstream edge of the tipping wrapper of between about 0.08 millimeters and about 0.12 millimeters. When calculating the stacking angle of the entire stack of aerosol-generating articles, the upper and lower step changes have to be taken into account, such that the stacking angle comprises (depending on the orientation of the seam) 2 to 3 times the single tipping paper thickness.

The reduction in the stacking angle effect also allows the present invention to accommodate aerosol-generating articles comprising a high density aerosol-generating substrate, which shifts the centre of mass of each aerosol-generating article further away from the tipping wrapper and towards the aerosol-generating substrate when compared to a conventional filter cigarette. Therefore, in those embodiments in which the plurality of rod-shaped consumer goods comprises a plurality of aerosol-generating articles, the distance between the centre of mass of each aerosol-generating article and the midpoint along the length of each aerosol-generating article is preferably between about 5 percent of the total length of the aerosol-generating article and about 20 percent of the total length of the aerosol-generating article, more preferably between about 7 percent of the total length of the aerosol-generating article and about 15 percent of the total length of the aerosol-generating article, most preferably between about 10 percent of the total length of the aerosol-generating article and about 15 percent of the total length of the aerosol-generating article.

Preferably, the aerosol-generating substrate is a solid aerosol-generating substrate. The aerosol-generating substrate may comprise both solid and liquid components.

Preferably, the aerosol-generating substrate comprises nicotine. In some preferred embodiments, the aerosol-generating substrate comprises tobacco. For example, the aerosol-generating material may be a sheet of homogenised tobacco.

Alternatively, or in addition, the aerosol-generating substrate may comprise a non-tobacco containing aerosol-generating material. For example, the aerosol-generating material may be a sheet comprising a nicotine salt and an aerosol former.

If the aerosol-generating substrate is a solid aerosol-generating substrate, the solid aerosol-generating substrate may comprise, for example, one or more of: powder, granules, pellets, shreds, strands, strips or sheets containing one or more of: herb leaf, tobacco leaf, tobacco ribs, expanded tobacco and homogenised tobacco.

Optionally, the solid aerosol-generating substrate may contain tobacco or non-tobacco volatile flavour compounds, which are released upon heating of the solid aerosol-generating substrate. The solid aerosol-generating substrate may also contain one or more capsules that, for example, include additional tobacco volatile flavour compounds or non-tobacco volatile flavour compounds. Such capsules may melt during heating of the solid aerosol-generating substrate.

Optionally, the solid aerosol-generating substrate may be provided on or embedded in a thermally stable carrier. The carrier may take the form of powder, granules, pellets, shreds, strands, strips or sheets. The solid aerosol-generating substrate may be deposited on the surface of the carrier in the form of, for example, a sheet, foam, gel or slurry. The solid aerosol-generating substrate may be deposited on the entire surface of the carrier, or alternatively, may be deposited in a pattern in order to provide a non-uniform flavour delivery during use.

As used herein, the term 'homogenised tobacco material' denotes a material formed by agglomerating particulate tobacco.

As used herein, the term 'sheet' denotes a laminar element having a width and length substantially greater than the thickness thereof.

As used herein, the term 'gathered' is used to describe a sheet that is convoluted, folded, or otherwise compressed or constricted substantially transversely to the longitudinal axis of the aerosol-generating article.

In a preferred embodiment, the aerosol-generating substrate comprises a gathered textured sheet of homogenised tobacco material.

As used herein, the term 'textured sheet' denotes a sheet that has been crimped, embossed, debossed, perforated or otherwise deformed. The aerosol-generating substrate may comprise a gathered textured sheet of homogenised tobacco material comprising a plurality of spaced-apart indentations, protrusions, perforations or a combination thereof. In a particularly preferred embodiment, the aerosol-generating substrate comprises a gathered crimped sheet of homogenised tobacco material.

Use of a textured sheet of homogenised tobacco material may advantageously facilitate gathering of the sheet of homogenised tobacco material to form the aerosol-generating substrate.

As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-generating substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled.

The aerosol-generating substrate may be in the form of a plug comprising an aerosol-generating material circumscribed by a paper or other wrapper. Where an aerosol-generating substrate is in the form of a plug, the entire plug including any wrapper is considered to be the aerosol-generating substrate.

In a preferred embodiment, the aerosol-generating substrate comprises a plug comprising a gathered sheet of homogenised tobacco material, or other aerosol-generating material, circumscribed by a wrapper.

As used herein, the term 'aerosol former' is used to describe any suitable known compound or mixture of compounds that, in use, forms or facilitates formation of an aerosol and that is substantially resistant to thermal degradation at the operating temperature of the aerosol-generating article.

Suitable aerosol-formers are known in the art and include, but are not limited to: monohydric alcohols, such as menthol; polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate.

Preferred aerosol formers are polyhydric alcohols or mixtures thereof, such as propylene glycol, triethylene glycol, 1,3-butanediol and, most preferred, glycerine.

The aerosol-generating substrate may comprise a single aerosol former. Alternatively, the aerosol-generating substrate may comprise a combination of two or more aerosol formers.

Preferably, the aerosol-generating substrate has an aerosol former content of greater than 5% on a dry weight basis.

The aerosol aerosol-generating substrate may have an aerosol former content of between approximately 5% and approximately 30% on a dry weight basis.

In a preferred embodiment, the aerosol-generating substrate has an aerosol former content of approximately 20% on a dry weight basis.

Aerosol-generating substrates comprising gathered sheets of homogenised tobacco for use in aerosol-generating articles may be made by methods known in the art, for example the methods disclosed in WO 2012/164009 A2.

Preferably, the aerosol-generating substrate has an external diameter of at least 5 millimeters. The aerosol-generating substrate may have an external diameter of between approximately 5 millimeters and approximately 12 millimeters, for example of between approximately 5 millimeters and approximately 10 millimeters or of between approximately 6 millimeters and approximately 8 millimeters. In a preferred embodiment, the aerosol-generating substrate has an external diameter of 7.2 millimeters plus or minus 10 percent.

The aerosol-generating substrate may have a length of between approximately 5 millimeters and approximately 15 millimeters, for example between about 8 millimeters and about 12 millimeters. In one embodiment, the aerosol-generating substrate may have a length of approximately 10 millimeters. In a preferred embodiment, the aerosol-generating substrate has a length of approximately 12 millimeters.

Preferably, the aerosol-generating substrate is substantially cylindrical.

A support element may be located immediately downstream of the aerosol-generating substrate and may abut the aerosol-generating substrate.

The support element may be formed from any suitable material or combination of materials. For example, the support element may be formed from one or more materials selected from the group consisting of: cellulose acetate; cardboard; crimped paper, such as crimped heat resistant paper or crimped parchment paper; and polymeric materials, such as low density polyethylene (LDPE). In a preferred embodiment, the support element is formed from cellulose acetate.

The support element may comprise a hollow tubular element. In a preferred embodiment, the support element comprises a hollow cellulose acetate tube.

The support element preferably has an external diameter that is approximately equal to the external diameter of the aerosol-generating substrate.

The support element may have an external diameter of between approximately 5 millimeters and approximately 12 millimeters, for example of between approximately 5 millimeters and approximately 10 millimeters or of between approximately 6 millimeters and approximately 8 millimeters. In a preferred embodiment, the support element has an external diameter of 7.2 millimeters plus or minus 10 percent.

The support element may have a length of between approximately 5 millimeters and approximately 15 millimeters. In a preferred embodiment, the support element has a length of approximately 8 millimeters.

An aerosol-cooling element may be located downstream of the aerosol-generating substrate, for example an aerosol-cooling element may be located immediately downstream of a support element, and may abut the support element.

The aerosol-cooling element may be located between the support element and the mouthpiece located at the extreme downstream end of the aerosol-generating article.

The aerosol-cooling element may have a total surface area of between approximately 300 square millimeters per millimeter length and approximately 1000 square millimeters per millimeter length. In a preferred embodiment, the aerosol-cooling element has a total surface area of approximately 500 square millimeters per millimeter length.

The aerosol-cooling element may be alternatively termed a heat exchanger.

The aerosol-cooling element preferably has a low resistance to draw. That is, the aerosol-cooling element preferably offers a low resistance to the passage of air through the aerosol-generating article. Preferably, the aerosol-cooling element does not substantially affect the resistance to draw of the aerosol-generating article.

The aerosol-cooling element may comprise a plurality of longitudinally extending channels. The plurality of longitudinally extending channels may be defined by a sheet material that has been one or more of crimped, pleated, gathered and folded to form the channels. The plurality of longitudinally extending channels may be defined by a single sheet that has been one or more of crimped, pleated, gathered and folded to form multiple channels. Alternatively, the plurality of longitudinally extending channels may be defined by multiple sheets that have been one or more of crimped, pleated, gathered and folded to form multiple channels.

In some embodiments, the aerosol-cooling element may comprise a gathered sheet of material selected from the group consisting of metallic foil, polymeric material, substantially non-porous paper or cardboard, and combinations thereof. In some embodiments, the aerosol-cooling element may comprise a gathered sheet of material selected from the group consisting of polyethylene (PE), polypropylene (PP), polyvinylchloride (PVC), polyethylene terephthalate (PET), polylactic acid (PLA), cellulose acetate (CA), aluminium foil, and combinations thereof.

In a preferred embodiment, the aerosol-cooling element comprises a gathered sheet of biodegradable material. For example, a gathered sheet of non-porous paper or a gathered sheet of biodegradable polymeric material, such as polylactic acid or a grade of Mater-Bi® (a commercially available family of starch based copolyesters).

In a particularly preferred embodiment, the aerosol-cooling element comprises a gathered sheet of polylactic acid.

The aerosol-cooling element may be formed from a gathered sheet of material having a specific surface area of between approximately 10 square millimeters per milligram and approximately 100 square millimeters per milligram weight. In some embodiments, the aerosol-cooling element may be formed from a gathered sheet of material having a specific surface area of approximately 35 square millimeters per milligram.

The mouthpiece may be located immediately downstream of an aerosol-cooling element and may abut the aerosol-cooling element. The mouthpiece may comprise a filter. The filter may be formed from one or more suitable filtration materials. Many such filtration materials are known in the art. In one embodiment, the mouthpiece may comprise a filter formed from cellulose acetate tow.

The mouthpiece preferably has an external diameter that is approximately equal to the external diameter of the aerosol-generating substrate.

The mouthpiece may have an external diameter of a diameter of between approximately 5 millimeters and approximately 10 millimeters, for example of between approximately 6 millimeters and approximately 8 millimeters. In a preferred embodiment, the mouthpiece has an external diameter of 7.2 millimeters plus or minus 10 percent.

The mouthpiece may have a length of between approximately 5 millimeters and approximately 20 millimeters. In a preferred embodiment, the mouthpiece has a length of approximately 14 millimeters.

The mouthpiece may have a length of between approximately 5 millimeters and approximately 14 millimeters. In a preferred embodiment, the mouthpiece has a length of approximately 7 millimeters.

The aerosol-generating substrate and any other elements upstream of the mouthpiece, such as a support element and an aerosol-cooling element, are circumscribed by an outer wrapper. The outer wrapper may be formed from any suitable material or combination of materials. Preferably, the outer wrapper is a cigarette paper.

The aerosol-generating article may have a total length of between about 40 millimeters and about 50 millimeters, for example approximately 45 millimeters.

The present invention also provides a feeding apparatus suitable for feeding rod-shaped consumer goods to a packing apparatus in accordance with the method according to the first aspect of the present invention, in accordance with any of the embodiments described above.

Therefore, according to a second aspect of the present invention there is provided a feeding apparatus for feeding rod-shaped consumer goods to a packing apparatus, the feeding apparatus comprising a stacking channel having an upstream end and a downstream end, wherein the stacking channel is configured to receive a plurality of rod-shaped consumer goods at the upstream end. The upstream end is higher than the downstream end in the vertical direction, and at least a portion of the stacking channel extends at an angle of between about 25 degrees and about 75 degrees with respect to the vertical direction. The feeding apparatus further comprises a hopper positioned at the downstream end of the stacking channel to receive the plurality of rod-shaped consumer goods from the stacking channel, the hopper configured to distribute the plurality of rod-shaped consumer goods into a packing apparatus.

As discussed above, the range of between about 25 degrees and about 75 degrees for the angle of at least a portion of the stacking channel with respect to the vertical direction provides a balance between angles that are shallow enough to provide a signification reduction in the compressive gravitational forces acting along the stacking channel and angles that are steep enough so that the component of gravitational force acting along the stacking channel is sufficient to facilitate movement of the consumer goods along the stacking channel and into the hopper, as well as minimising the floor space, or 'footprint', occupied by the stacking channel. Preferably, at least a portion of the stacking channel extends at an angle of between about 35 degrees and about 55 degrees with respect to the vertical direction, more preferably between about 40 degrees and about 50 degrees with respect to the vertical direction, most preferably about 45 degrees with respect to the vertical direction.

The stacking channel may be substantially linear along the entire length between its upstream and downstream ends. That is, the stacking channel may comprise a single linear segment extending between its upstream and downstream ends.

Alternatively, the stacking channel may comprise multiple linear segments, wherein each linear segment extends at a different angle with respect to the vertical direction. In such embodiments, all of the linear segments may extend at an angle of between about 25 degrees and about 75 degrees with respect to the vertical direction, preferably between about 35 degrees and about 55 degrees with respect to the vertical direction, more preferably between about 40 degrees and about 50 degrees with respect to the vertical direction, most preferably about 45 degrees with respect to the vertical direction.

Alternatively, only some of the linear segments may extend at an angle of between about 25 degrees and about 75 degrees with respect to the vertical direction, preferably between about 35 degrees and about 55 degrees with respect to the vertical direction, more preferably between about 40 degrees and about 50 degrees with respect to the vertical direction, most preferably about 45 degrees with respect to the vertical direction. For example, the stacking channel may comprise an upstream segment extending at an angle of less than about 25 degrees with respect to the vertical direction, an intermediate segment extending at an angle of between about 25 degrees and about 75 degrees, and a downstream segment extending at an angle of greater than about 75 degrees.

In a further alternative, at least a portion of the stacking channel may be curved. In some embodiments, the stacking channel may be curved along substantially its entire length. In such embodiments, the angle of the stacking channel with respect to the vertical direction will vary along the length of the stacking channel. Preferably, the angle of the stacking channel with respect to the vertical direction increases in the downstream direction.

In those embodiments in which the stacking channel is curved, the angle of the stacking channel may be between about 25 degrees and about 75 degrees at each point along the entire length of the stacking channel. Alternatively, only a portion of the stacking channel may extend at an angle of between about 25 degrees and about 75 degrees with respect to the vertical direction. For example, the upstream end of the stacking channel may extend at an angle of less than about 25 degrees with respect to the vertical direction. In some embodiments, the upstream end of the stacking channel may be substantially vertical. Additionally, or alternatively, the downstream end of the stacking channel may extend at an angle of greater than about 75 degrees with respect to the vertical direction. In any of these embodiments, at least a central portion of the stacking channel extends at an angle of between about 25 degrees and about 75 degrees with respect to the vertical direction.

In any of the embodiments described above, the feeding apparatus may further comprise at least one conveyor extending along at least a portion of the stacking channel between the upstream and downstream ends, wherein the at least one conveyor is configured to facilitate movement of the plurality of rod-shaped consumer goods along at least a portion of the stacking channel in the downstream direction. For example, the feeding apparatus may comprise at least one conveyor extending along a bottom side of the stacking channel along substantially the entire length of the stacking channel. Additionally, or alternatively, the feeding apparatus may comprise at least one conveyor extending along a top side of the stacking channel along substantially the entire length of the stacking channel.

Alternatively, the feeding apparatus may comprise one or more conveyors provided along only a portion of the stacking channel. For example, in those embodiments in which the angle between the stacking channel and the vertical direction is greater at the downstream end of the stacking channel, the feeding apparatus may comprise one or more conveyors extending along only a downstream portion of the stacking channel. The one or more conveyors may extend along the bottom side of the stacking channel, along the top side of the stacking channel, or along both the bottom and top sides of the stacking channel.

In any of the embodiments described above in which the feeding apparatus comprises at least one conveyor, the at least one conveyor may comprise at least one of a mechanically driven belt, such as a toothed belt, or a directed airflow.

In any of the embodiments described above, the feeding apparatus may further comprise means for agitating the plurality of rod-shaped consumer goods as they move along the stacking channel. For example, the feeding apparatus may comprise a mechanical means for vibrating or otherwise agitating the plurality of rod-shaped consumer goods. In those embodiments comprising one or more conveyors, at least one of the conveyors may be configured to vibrate. Additionally, or alternatively, the feeding apparatus may comprise an airflow or multiple airflows that can create an air cushion in the mass flow of consumer goods. Such an air cushion can reduce friction between the consumer goods and facilitate a smooth product flow. The one or multiple airflows may be directed against the flow of consumer goods, so that the airflow is directed in the upstream direction.

In any of the embodiments described above, the stacking channel may have a length of between about 30 centimeters and about 300 centimeters between the upstream and downstream ends, preferably between about 50 centimeters and about 300 centimeters, more preferably between about 100 centimeters and about 300 centimeters. Using a stacking channel having a length within one of these ranges allows the stacking channel to function effectively as a buffer between an upstream manufacturing process and the packing process downstream of the hopper.

The invention will be further described, by way of example only, with reference to the accompanying drawings in which:

FIG. 3 shows a feeding apparatus for feeding aerosol-generating articles to a packing apparatus, in accordance with a first embodiment of the present invention;

FIG. 4 shows an enlarged view of a portion of the stacking channel of the feeding apparatus of FIG. 3;

Figure 1:
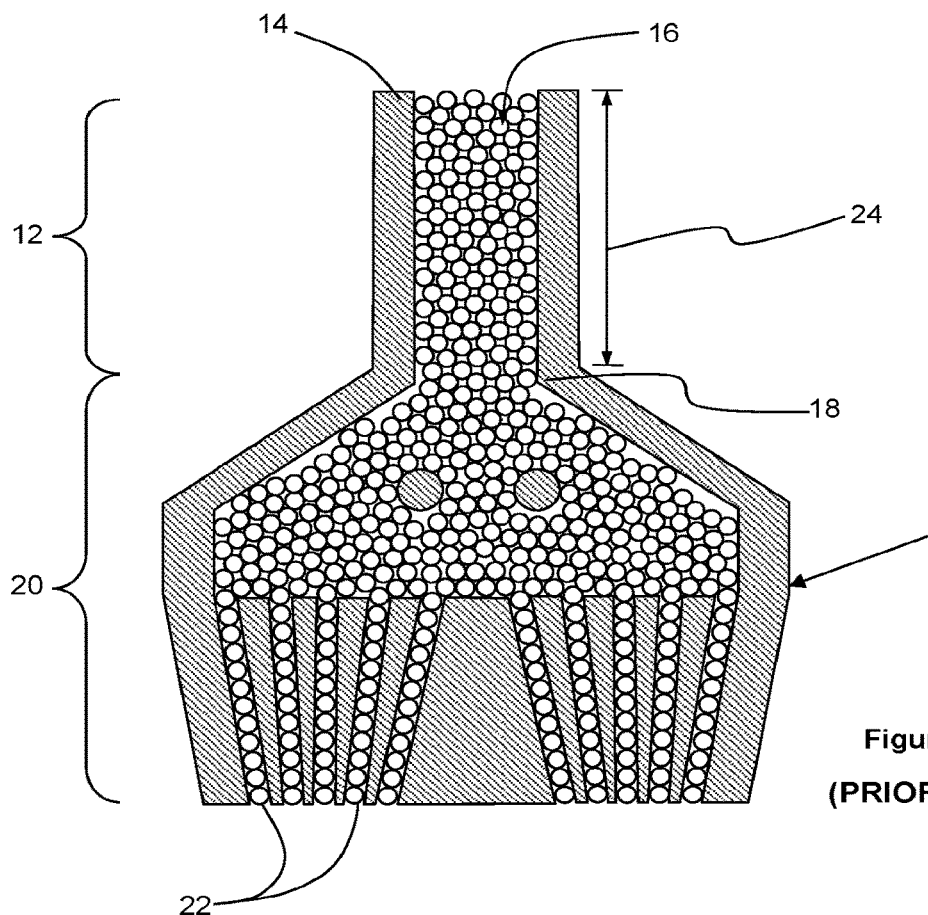
FIG. 1 shows a prior art feeding apparatus for feeding aerosol-generating articles to a packing apparatus.

FIG. 1 shows a prior art feeding apparatus 10 for feeding a plurality of aerosol-generating articles, such as smoking articles, from an upstream manufacturing process to a downstream packing apparatus. The feeding apparatus 10 comprises a stacking channel 12 comprising an upstream end 14 into which a continuous supply of aerosol-generating articles 16 is received from an upstream manufacturing process. The aerosol-generating articles 16 fall downward through the stacking channel 12 under gravity and exit a downstream end 18 of the stacking channel 12 into a hopper 20. At the base of the hopper 20 the aerosol-generating articles 16 fall through individual feeding channels 22 from which they are fed into a downstream packing apparatus (not shown).

As shown in FIG. 1, the maximum height of the stack of aerosol-generating articles 16 in the stacking channel 12 is the same as the length 24 of the vertical stacking channel 12 between its upstream and downstream ends 14, 18. Therefore, in the example shown in FIG. 1, the maximum height of the stack of aerosol-generating articles 16 in the stacking channel 12 is approximately twenty-two aerosol-generating articles. However, due to the step-change in the outer diameter of each aerosol-generating article 16 as a result of the thickness of the tipping wrapper, a stack of this height can result in a significant 'stacking angle' at the top of the stack, which can cause jams in the stacking channel 12.

Figure 2:
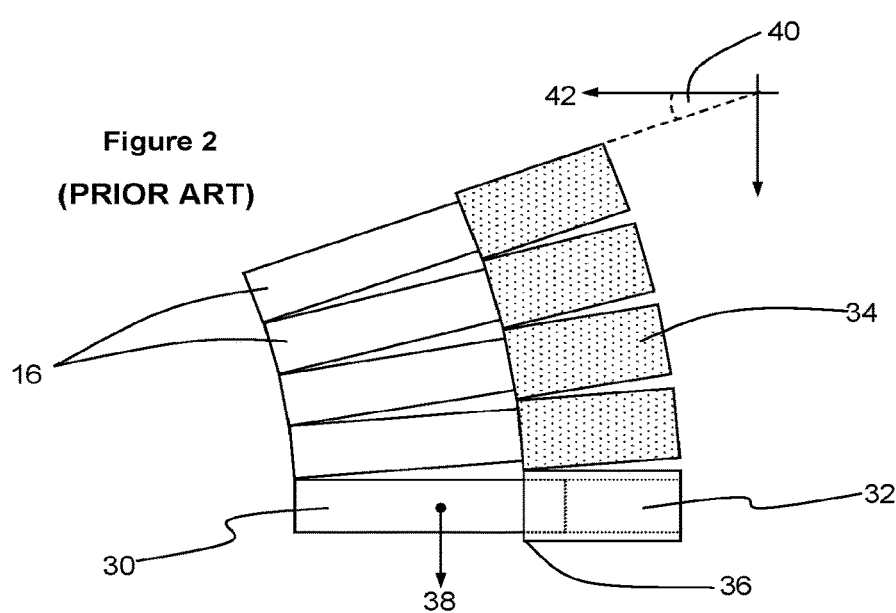
FIG. 2 shows a side view of several aerosol-generating articles in the stacking channel of the feeding apparatus of FIG. 1.

FIG. 2 shows a side view of part of the stack of aerosol-generating articles 16 within the stacking channel 12 of the feeding apparatus 10 shown in FIG. 1. Each aerosol-generating article 16 comprises an aerosol-generating substrate 30 secured to a mouthpiece 32 by a tipping wrapper 34. The thickness of the tipping wrapper 34 has been exaggerated to more clearly illustrate the step change in the outer diameter of each aerosol-generating article 16 at the upstream edge 36 of the tipping wrapper 34. As a result of the centre of mass 38 of each aerosol-generating article 16 being positioned upstream of the tipping wrapper 34, each aerosol-generating article 16 lies at an angle with respect to the underlying aerosol-generating article 16 on which it sits. Although each individual angle is relatively small, as shown in FIG. 2 the angles between consecutive pairs of aerosol-generating articles 16 provide a cumulative effect such that a significant stacking angle 40 with respect to the horizontal direction 42 is formed at the top of the stack. Over the total height of the entire stack in a vertical stacking channel the stacking angle 40 can be large enough to cause the aerosol-generating articles 16 at the top of the stack to tip into a vertical orientation, which can cause jams in the feeding apparatus 10, particularly at the bottom of the hopper 20 where the aerosol-generating articles 16 reach the individual feeding channels 22.

FIG. 3 shows a feeding apparatus 100 according to a first embodiment of the present invention. Some of the components of the feeding apparatus 100 are substantially the same as the respective components of the feeding apparatus 10 shown in FIG. 1, and like reference numerals are used to denote like parts.

The feeding apparatus 100 comprises a stacking channel 112 comprising an upstream end 14 into which a continuous supply of aerosol-generating articles 16 is received from an upstream manufacturing process. The aerosol-generating articles 16 fall along the stacking channel 112 under gravity and exit a downstream end 18 of the stacking channel 112 into a hopper 20. At the base of the hopper 20 the aerosol-generating articles 16 fall through individual feeding channels 22 from which they are fed into a downstream packing apparatus (not shown).

As shown in FIG. 3, the stacking channel 112 extends at an angle 113 of approximately forty-five degrees with respect to the vertical direction 115. By using an angled stacking channel 112, the feeding apparatus 100 according to the present invention reduces the compressive gravitational forces acting along the stack of aerosol-generating articles 16 in the downstream direction of the stacking channel 112.

Furthermore, as shown more clearly in FIG. 4, which shows an enlarged view of a portion of the stacking channel 112, using an angled stacking channel 112 also reduces the effective vertical height 117 of the stack of aerosol-generating articles 16. In particular, although the length and width of the stacking channel 112 are substantially the same as the length and width of the vertical stacking channel 12 shown in FIG. 1, the maximum effective vertical height 117 of the stack of aerosol-generating articles 16 in the stacking channel 112 is only about three to four aerosol-generating articles. Therefore, since the 'stacking angle' effect occurs in stacks of aerosol-generating articles 16 in the vertical direction, the maximum stacking angle in the stacking channel 112 is significantly lower than the maximum stacking angle in the vertical stacking channel 12 shown in FIG. 1. Therefore, by using an angled stacking channel 112, the feeding apparatus 100 according to the present invention provides a significant reduction in the maximum stacking angle and can therefore significantly reduce the risk of jams caused by incorrectly oriented aerosol-generating articles.

Figure 5:
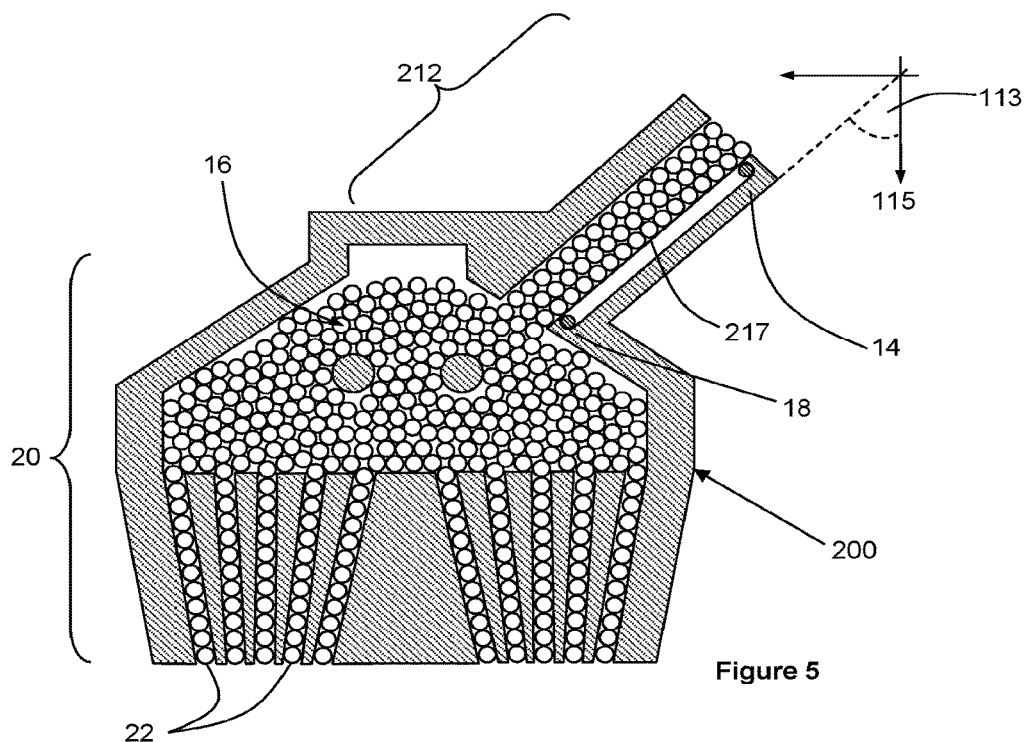
FIG. 5 shows a feeding apparatus for feeding aerosol-generating articles to a packing apparatus, in accordance with a second embodiment of the present invention.

FIG. 5 shows a feeding apparatus 200 according to a second embodiment of the present invention. The feeding apparatus 200 shown in FIG. 5 is substantially the same as the feeding apparatus 100 shown in FIG. 3, and like reference numerals are used to designate like parts. The feeding apparatus 200 shown in FIG. 5 differs by the addition of a conveyor 217 extending along a portion of the stacking channel 212. The conveyor 217 assists the movement of the aerosol-generating articles 16 along the stacking channel 212 in the downstream direction.

Figure 6:
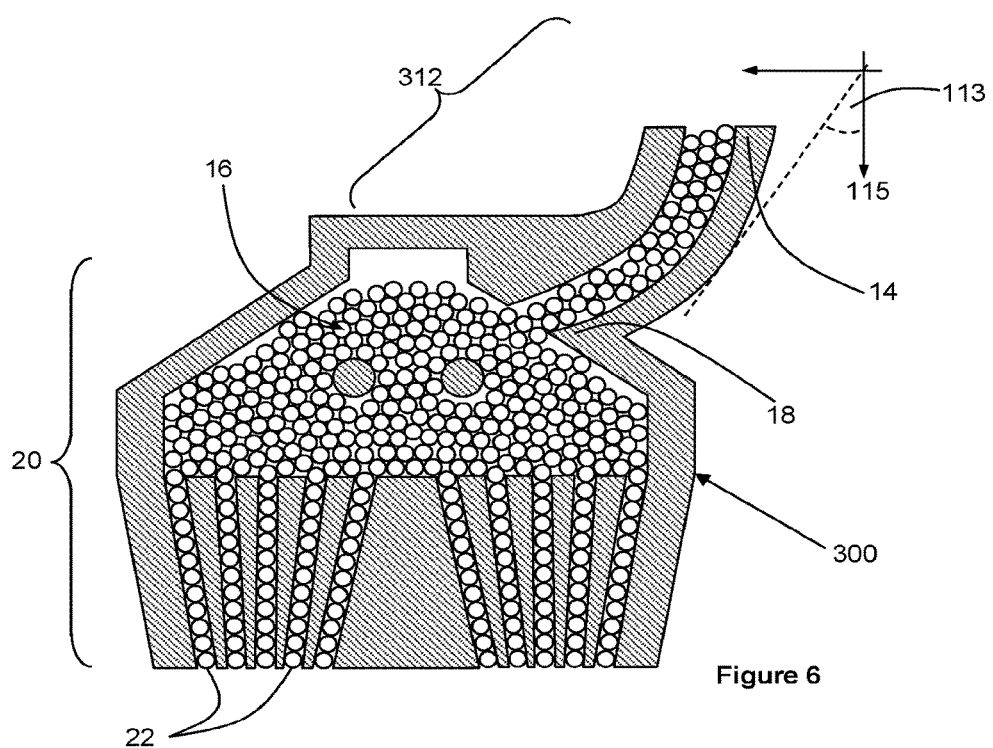
FIG. 6 shows a feeding apparatus for feeding aerosol-generating articles to a packing apparatus, in accordance with a third embodiment of the present invention.

FIG. 6 shows a feeding apparatus 300 according to a third embodiment of the present invention. The feeding apparatus 300 shown in FIG. 6 is substantially the same as the feeding apparatus 100 shown in FIG. 3, and like reference numerals are used to designate like parts. The feeding apparatus 300 shown in FIG. 6 differs by the shape of the stacking channel 312. The stacking channel 312 has a curved shape so that the angle 113 of the stacking channel 312 with respect to the vertical direction 115 increases in the downstream direction. The upstream end 14 of the stacking channel 312 extends substantially in the vertical direction 115.

The invention claimed is:

1. A method of feeding rod-shaped consumer goods to a packing apparatus, the method comprising:
    providing a plurality of rod-shaped consumer goods to an upstream end of a stacking channel, comprising providing a plurality of aerosol-generating articles, each aerosol-generating article comprising an aerosol-generating substrate, a mouthpiece, and a tipping wrapper securing the mouthpiece to a downstream end of the aerosol-generating substrate, wherein the tipping wrapper has an upstream edge extending around the aerosol-generating substrate and a downstream edge extending around a downstream end of the mouthpiece, and wherein a distance between an upstream end of the aerosol-generating substrate and the upstream edge of the tipping wrapper is less than about 40 mm;
    feeding the plurality of aerosol-generating articles along the stacking channel to a downstream end of the stacking channel, wherein the upstream end is higher than the downstream end in a vertical direction, and wherein at least a portion of the stacking channel extends at an angle of between about 25 degrees and about 75 degrees with respect to the vertical direction;
    receiving the plurality of aerosol-generating articles into a hopper from the downstream end of the stacking channel; and
    distributing the plurality of aerosol-generating articles from the hopper into a packing apparatus.

2. The method according to claim 1, wherein said at least a portion of the stacking channel extends at an angle of between about 35 degrees and about 55 degrees with respect to the vertical direction.

3. The method according to claim 1, wherein the stacking channel is substantially linear.

4. The method according to claim 1, wherein the stacking channel is curved so that the angle of the stacking channel with respect to the vertical direction increases in the downstream direction.

5. The method according to claim 4, wherein the upstream end of the stacking channel extends substantially in the vertical direction.

6. The method according to claim 1, wherein the feeding the plurality of aerosol-generating articles along the stacking channel comprises moving the plurality of aerosol-generating articles on at least one conveyor along at least a portion of the stacking channel in the downstream direction.

7. The method according to claim 1, wherein the tipping wrapper has a thickness of between about 0.04 mm and about 0.06 mm.

8. The method according to claim 1, wherein each aerosol-generating article has a total length of between about 40 mm and about 50 mm.

9. The method according to claim 1, wherein each aerosol-generating article has a centre of mass, and wherein a distance from a midpoint along the length of the aerosol-generating article to the centre of mass, in a direction away from the tipping wrapper and towards the aerosol-generating substrate, is between 5 percent of a total length of the aerosol-generating article and 20 percent of the total length of the aerosol-generating article.

10. The method according to claim 1, wherein the aerosol-generating substrate of each aerosol-generating article has an external diameter of 7.2 mm plus or minus 10 percent.

* * * * *